(12) United States Patent
Maeno et al.

(10) Patent No.: US 10,181,750 B2
(45) Date of Patent: Jan. 15, 2019

(54) CHARGE CONTROL DEVICE

(71) Applicants: TOYOTA JIDOSHA KABUSHIKI KAISHA, Toyota-shi, Aichi (JP); FUJITSU TEN LIMITED, Kobe-shi, Hyogo (JP)

(72) Inventors: Seigen Maeno, Toyota (JP); Takuya Hibino, Kobe (JP); Yohsuke Ochi, Toyota (JP)

(73) Assignees: TOYOTA JIDOSHA KABUSHIKI KAISHA, Toyota-shi, Aichi-ken (JP); DENSO TEN LIMITED, Hyogo-ku, Kobe (JP)

( * ) Notice: Subject to any disclaimer, the term of this patent is extended or adjusted under 35 U.S.C. 154(b) by 58 days.

(21) Appl. No.: 14/896,127

(22) PCT Filed: Apr. 10, 2014

(86) PCT No.: PCT/JP2014/060419
§ 371 (c)(1),
(2) Date: Dec. 4, 2015

(87) PCT Pub. No.: WO2014/203602
PCT Pub. Date: Dec. 24, 2014

(65) Prior Publication Data
US 2016/0134157 A1 May 12, 2016

(30) Foreign Application Priority Data
Jun. 18, 2013 (JP) .................................. 2013-127087

(51) Int. Cl.
*H02J 7/00* (2006.01)
*H02J 7/35* (2006.01)
(Continued)

(52) U.S. Cl.
CPC ............. *H02J 7/35* (2013.01); *H02J 7/007* (2013.01); *H02J 5/00* (2013.01); *H02J 9/062* (2013.01);
(Continued)

(58) Field of Classification Search
CPC ...... H02J 7/35; H02J 7/007; H02J 5/00; H02J 9/062; H02M 2001/009; H02M 5/32;
(Continued)

(56) References Cited

U.S. PATENT DOCUMENTS 3,769,088 A * 10/1973 Seiger ...................... H02J 7/35
429/222
4,742,291 A * 5/1988 Bobier ...................... H02J 7/35
136/293
(Continued)

FOREIGN PATENT DOCUMENTS

CN  102687368 A  9/2012
JP  08-032648 A  2/1996
(Continued)

OTHER PUBLICATIONS

Matthew Wells; "Model of smart solar PV charge controller"; Year: 2011; 2011 IEEE Long Island Systems, Applications and Technology Conference; pp. 1-5, Cited by: Papers (2).*
(Continued)

*Primary Examiner* — Helen Rossoshek
(74) *Attorney, Agent, or Firm* — Sughrue Mion, PLLC

(57) ABSTRACT

When a microcomputer does not charge an electric storage device, the microcomputer activates at an interval set based on a timer set value and determines whether an electric power voltage generated by a solar cell is equal to or higher than an electric power generation determination threshold. When the generated electric power voltage is lower than the electric power generation determination threshold, the
(Continued)

microcomputer turns to a sleep state after increasing the timer set value by an addition set value while prohibiting charging the electric storage device. When the generated electric power voltage is equal to or higher than the electric power generation determination threshold and a generated electric power amount is equal to or larger than an electric power generation determination threshold, the microcomputer starts charging the electric storage device so the electric power device can be appropriately charged with an electric power generated by the solar cell.

3 Claims, 5 Drawing Sheets

(51) Int. Cl.
  *H02J 9/06* (2006.01)
  *H02J 5/00* (2016.01)
  *H02M 1/00* (2006.01)
(52) U.S. Cl.
  CPC ........ *H02M 2001/009* (2013.01); *Y02B 10/72* (2013.01); *Y10T 307/615* (2015.04)
(58) Field of Classification Search
  CPC ...... H02M 5/38; Y02B 10/72; Y10T 307/615; Y10T 307/62
  See application file for complete search history.

(56) References Cited

U.S. PATENT DOCUMENTS

| | | | | |
|---|---|---|---|---|
| 6,257,264 B1* | 7/2001 | Sturman | A01G 25/16 | 137/1 |
| 6,685,334 B2* | 2/2004 | Kenny | H02J 7/35 | 362/154 |
| 7,101,475 B1* | 9/2006 | Maaske | E04H 4/1263 | 210/106 |
| 7,566,828 B2* | 7/2009 | Sasaki | H02J 7/35 | 136/243 |
| 7,566,991 B2* | 7/2009 | Blackman | H02J 5/00 | 307/64 |
| 8,312,660 B1* | 11/2012 | Fujisaki | F41A 17/08 | 42/70.01 |
| 8,563,845 B2* | 10/2013 | Work | H02J 7/35 | 136/244 |
| 8,817,000 B1* | 8/2014 | Sauvage | G06F 1/28 | 345/207 |
| 2003/0047209 A1* | 3/2003 | Yanai | H02J 3/32 | 136/244 |
| 2009/0129067 A1* | 5/2009 | Fan | B63B 51/02 | 362/183 |
| 2010/0060231 A1* | 3/2010 | Trainor | H01G 11/14 | 320/103 |
| 2010/0328933 A1* | 12/2010 | Maldonado | F21S 9/035 | 362/183 |
| 2011/0006905 A1 | 1/2011 | Masuda | | |
| 2011/0062888 A1* | 3/2011 | Bondy | H05B 33/0815 | 315/294 |
| 2011/0169344 A1* | 7/2011 | Suekane | H02J 3/383 | 307/151 |
| 2011/0242802 A1* | 10/2011 | Work | H02J 7/35 | 362/183 |
| 2011/0262114 A1* | 10/2011 | Montgomery | F24F 1/025 | 392/365 |
| 2011/0285356 A1* | 11/2011 | Maluf | H02J 7/0052 | 320/139 |
| 2012/0020060 A1* | 1/2012 | Myer | F21S 2/00 | 362/183 |
| 2012/0047386 A1* | 2/2012 | Matsui | H01M 10/465 | 713/340 |
| 2012/0080952 A1* | 4/2012 | Yoshikuni | H02J 1/10 | 307/52 |
| 2012/0091968 A1* | 4/2012 | Heo | H02J 7/35 | 320/138 |
| 2012/0143383 A1* | 6/2012 | Cooperrider | H04Q 9/00 | 700/295 |
| 2012/0212183 A1* | 8/2012 | Yamada | H02J 3/32 | 320/126 |
| 2012/0227729 A1* | 9/2012 | Lundahl | F24J 2/38 | 126/601 |
| 2012/0235625 A1* | 9/2012 | Takehara | H01M 10/44 | 320/101 |
| 2013/0106188 A1* | 5/2013 | Ishibashi | H02J 3/382 | 307/46 |
| 2013/0271148 A1* | 10/2013 | Maeda | B60L 3/0046 | 324/426 |
| 2013/0314022 A1* | 11/2013 | Ishibashi | H02J 7/007 | 320/101 |
| 2013/0338947 A1* | 12/2013 | John | H02J 7/35 | 702/60 |
| 2014/0063662 A1* | 3/2014 | Scott | G08B 13/22 | 361/42 |
| 2014/0070617 A1* | 3/2014 | Detmers | H02J 7/041 | 307/64 |
| 2014/0130844 A1* | 5/2014 | Yagi | H01L 31/048 | 136/246 |
| 2014/0152101 A1 | 6/2014 | Kusunose | | |
| 2014/0163854 A1* | 6/2014 | Matsumoto | B60L 11/1862 | 701/123 |
| 2014/0176043 A1 | 6/2014 | Fujiyama | | |
| 2014/0217826 A1 | 8/2014 | Oguchi et al. | | |
| 2014/0225572 A1* | 8/2014 | Rousselle | B60L 11/1844 | 320/137 |
| 2014/0287686 A1* | 9/2014 | Kobayashi | H04W 4/008 | 455/41.2 |
| 2015/0015179 A1* | 1/2015 | Yamada | H01M 10/44 | 320/101 |
| 2015/0323580 A1* | 11/2015 | Olson | G01V 3/10 | 324/207.22 |
| 2016/0190863 A1* | 6/2016 | Ogasawara | G04G 19/00 | 368/47 |

FOREIGN PATENT DOCUMENTS

| | | |
|---|---|---|
| JP | 2003-189477 A | 7/2003 |
| JP | 2005-316724 A | 11/2005 |
| JP | 2010-245203 A | 10/2010 |
| JP | 2011-019315 A | 1/2011 |
| JP | 2012-196022 A | 10/2012 |
| JP | 2012-254004 A | 12/2012 |
| JP | 2013-027208 A | 2/2013 |
| WO | 2011/083424 A1 | 7/2011 |
| WO | 2013/046638 A1 | 4/2013 |

OTHER PUBLICATIONS

Watthanawisuth et al.; "Microclimate real-time monitoring based on ZigBee sensor network"; Year: 2009; SENSORS, 2009 IEEE; pp. 1814-1818, Cited by: Papers (14).*

* cited by examiner

CHARGE CONTROL DEVICE

CROSS REFERENCE TO RELATED APPLICATIONS

This is a National Stage of International Application No. PCT/JP2014/060419 filed Apr. 10, 2014, claiming priority based on Japanese Patent Application No. 2013-127087 filed Jun. 18, 2013, the contents of all of which are incorporated herein by reference in their entirety.

TECHNICAL FIELD

The present invention relates to a charge control device for charging an electric storage device with an electric power generated by a solar cell.

BACKGROUND ART

Conventionally, for example, as proposed in JP 2012-196022 A, there is known a solar power generation system which includes a solar cell provided with solar panels, an electric storage device and a charge control device for charging the electric storage device with an electric power generated by the solar cell. In such a solar power generation system, when the solar cell generates an electric power, in other words, when the sun shines, the charge control device is configured to be activated to charge the electric storage device with an electric power output from the solar cell. In general, the charge control device includes a charger for charging the electric storage device, a voltage sensor for detecting an output voltage (a generated electric power voltage) of the solar cell and a microcomputer for controlling an operation of the charger. When the generated electric power voltage detected by the voltage sensor exceeds a set voltage, the microcomputer activates the solar power generation system to operate the charger, thereby to start charging the electric storage device.

SUMMARY OF INVENTION

FIG. 5 shows an example of an output voltage property of the solar cell. As can be understood from this property, even when a sunlight intensity (W/m$^2$) varies, an open circuit voltage of the solar cell (i.e., an output voltage of the solar cell when no electric current flows from the solar cell) is generally constant. Thus, in case that a system activation timing is set on the basis of the open circuit voltage of the solar cell, even when the sunlight intensity is small and thus, a generated electric power is insufficient, the solar power generation system is actually activated. In addition, under such a circumstance, after the activation of the solar power generation system, the output voltage of the solar cell decreases within a short time and as a result, the number of generations of an electric power carried out the solar power generation system may be caused to be increased. Therefore, this is not preferred in terms of an amount of the electric power consumed by the solar power generation system itself and durability of the solar power generation system.

The present invention has been made for solving the aforementioned problem and an object of the present invention is to appropriately charge the electric storage device with an electric power generated by the solar cell.

In order to achieve the aforementioned object, a charge control device for charging an electric storage device (50) with an electric power generated by a solar cell (10) according to the present invention is characterized in that the charge control device comprises:

electric power generation index acquisition means (S14, S16, S22) for acquiring an electric power generation index which indicates a magnitude of an electric power output from the solar cell at an acquisition timing set with a predetermined interval (Tset) when the charge control device does not charge the electric storage device;

charge activation control means (S17, S23, S24) for starting a charge operation for charging the electric storage device when the electric power generation index acquired by the electric power generation index acquisition means satisfies a charge start condition and prohibiting the charge operation for charging the electric storage device until a next acquisition timing when the electric power generation index does not satisfy the charge start condition; and interval variable means (S18) for increasing the predetermined interval in accordance with an increase of the number of consecutive prohibitions of the charge operation by the charge activation control means.

According to the present invention, the electric power generation index acquisition means acquires an electric power generation index, which indicates a magnitude of an electric power output of the solar cell, at an acquisition timing set with a predetermined interval when the charge control device does not charge the electric storage device. As the electric power generation index, for example, any one of an open circuit voltage of the solar cell (i.e., an output voltage when no electric current is caused to flow through a load), an amount of the electric power output from the solar cell, an electric current flowing from the solar cell and the like, may be employed. The charge activation control means starts a charge operation for charging the electric storage device when the electric power generation index acquired by the electric power generation index acquisition means satisfies the charge start condition and prohibits the charge operation for charging the electric storage device until a next acquisition timing when the electric power generation index does not satisfy the charge start condition. Therefore, a frequency of activating the charge operation can be limited by the predetermined interval. Further, when the electric power generation index acquired at the next acquisition timing does not satisfy the charge start condition, the charge operation for charging the electric storage device is further prohibited until a further next acquisition timing.

It is not preferred that an interval for acquiring the electric power generation index is set to a short interval in terms of a durability of the charge control device and an amount of the electric power consumed by the charge control device. On the other hand, when the interval for acquiring the electric power generation index is set to a long interval, the charge control device cannot respond change of irradiation of the sunlight and thus, an opportunity of the charge of the generated electric power may be lost. For example, when the interval for acquiring the electric power generation index is set to a long interval in case that a sufficient irradiation necessary for the electric power generation cannot be continuously obtained such as at a night time, a charge opportunity is unlikely to be lost. In this regard, the charge control device according to the present invention comprises the interval variable means. The interval variable means increases the predetermined interval in accordance with the increase of the number of the consecutive prohibitions of the charge operation by the charge activation control means. As a result, according to the present invention, the charge opportunity can be effectively captured and an improvement of the durability of the charge control device and a decrease of the consumed electric power amount can be achieved. Therefore, it is possible to appropriately charge the electric storage device with an electric power generated by the solar cell.

The charge control device according to the present invention is further characterized in that the electric power generation index acquisition means acquires an open circuit voltage (V) of the solar cell and an electric power correlation value having a correlation with the output electric power of the solar cell when an electric current is caused to flow from the solar cell as the electric power generation index, the charge start condition includes two conditions, i.e., a condition that the open circuit voltage is equal to or higher than a set voltage (S17) and a condition that the electric power correlation value is equal to or larger than a set electric power correlation value (S23), and the charge activation control means determines in advance whether the charge start condition relating to the open circuit voltage of the solar cell of the two conditions is satisfied.

The open circuit voltage of the solar cell can be used as the electric power generation index. In case that the open circuit voltage is used, even when no electric current is caused to flow from the solar cell to the load, an extent of the electric power generated by the solar cell can be determined, however, an ability of electric power generation of the solar cell is unlikely to be determined exactly only with the open circuit voltage. In this regard, according to the present invention, the electric power generation index acquisition means acquires the open circuit voltage of the solar cell and the electric power correlation value having a correlation with the output electric power of the solar cell when an electric current is caused to flow from the solar cell, as the electric power generation index. As the electric power correlation value, for example, an electric power output from the solar cell or an electric current flowing from the solar cell can be employed. The charge start condition includes two conditions, i.e., a condition that the open circuit voltage is equal to or higher than a set voltage and a condition that the electric power correlation value is equal to or larger than a set electric power correlation value. According to a property of the solar cell, even when a level of irradiation derived from the sunlight is low and thus, the electric power generation ability does not increase sufficiently, the open voltage increases in advance. Thus, when the open circuit voltage of the solar cell is smaller than the set voltage, it can be determined only using the open circuit voltage of the solar cell that the electric power generation ability of the solar cell is small. In this regard, the charge activation control means determines in advance whether the charge start condition relating to the open circuit voltage of the solar cell of the two conditions is satisfied. Thereby, when it can be determined only using the open circuit voltage of the solar cell that the electric power generation ability of the solar cell is small, it is not necessary to acquire the electric power correlation value. Therefore, in this case, a process for acquiring the electric power correlation value is not necessary and thus, a frequency of executing such a process can be reduced. As a result, according to the present invention, the electric storage device can be further appropriately charged with an electric power generated by the solar cell.

The present invention is further characterized in that the interval variable means increases the predetermined interval in accordance with the number of the consecutive prohibitions of the charge operation carried out when the open circuit voltage of the solar cell becomes lower than the set voltage (S17, S18).

When the open circuit voltage of the solar cell is lower than the set voltage, in many cases, an amount of the electric power generated by the solar cell does not increase promptly. In this regard, according to the present invention, the predetermined interval is increased in accordance with an increase of the number of consecutive prohibitions of the charge operation carried out when the open circuit voltage of the solar cell becomes lower than the set voltage. Thereby, the further appropriate predetermined interval can be set and a frequency of operating the charge control device can be reduced without losing the charge opportunity.

Note that in the above description, for facilitating understanding of the present invention, elements of the invention corresponding to elements of an embodiment are accompanied with reference symbols used for the elements of the embodiment, however, the elements of the invention are not limited to the elements of the embodiment denoted by the reference symbols.

MODE FOR CARRYING OUT THE INVENTION

Figure 1:
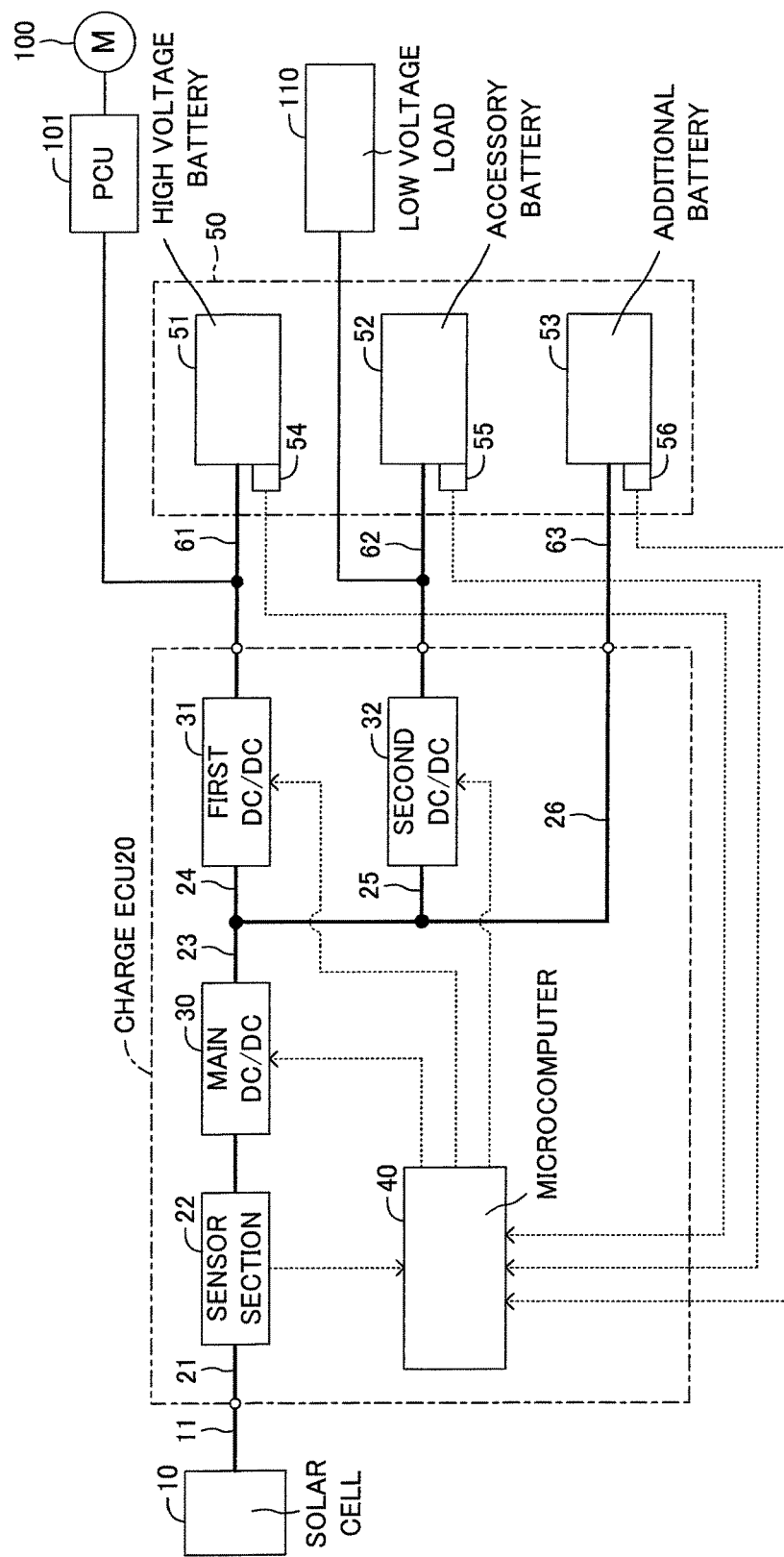
FIG. 1 shows a schematic configuration view of a solar power generation system according to an embodiment of the present invention.

Below, a charge control device according to an embodiment of the present invention will be described with reference to the drawings. FIG. 1 shows a schematic configuration view of a solar power generation system provided with the charge control device according to this embodiment. The solar power generation system according to this embodiment is applied to a vehicle, however, an application range of this solar power generation system is not limited to the vehicle. The solar power generation system includes a solar cell 10, a charge control unit 20 and an electric storage device 50. For example, the solar cell 10 includes solar panels positioned on a roof of the vehicle and is an electric power appliance for converting an energy of sunlight received by the solar panels to an electric energy. The charge control unit 20 is a control device for charging the electric storage device 50 with an electric power generated by the solar cell 10 and corresponds to a charge control device according to the present invention. Hereinafter, the charge control unit 20 will be referred to as the charge ECU 20. The electric storage device 50 includes a high voltage battery 51, an accessory battery 52 and an additional battery 53.

The vehicle provided with the solar power generation system according to the present invention is a vehicle provided with a travel-drive motor 100 for generating a travel-driving force such as an electric vehicle (EV), a hybrid vehicle (HV) and a plug-in hybrid vehicle (PHV). The high voltage battery 51 provided in the electric storage device 50 is provided mainly as a high voltage power source for driving the travel-drive motor 100. The high voltage battery 51 is, for example, a secondary cell which can output a voltage of about 300 V. The high voltage battery 51 can be charged with an electric power (a regenerative electric power) generated by the travel-drive motor 100 with a kinetic energy of rotation of vehicle wheels when a vehicle is being braked and an electric power supplied from an outside electric power source device (a plug-in station, a household electric outlet and the like) via a charge cable as well as the household solar power generation system. An electric supply from the high voltage battery 51 to the travel-drive motor 100 and an electric power regeneration from the travel-drive motor 100 to the high voltage battery 51 are controlled by a power control unit (PCU) 101.

Further, the accessory battery 52 is also a 12-volt system secondary cell provided as a low-voltage electric power source for supplying an electric power to a low-voltage load 110 which is a vehicle electric load except for the travel-drive motor 100. The additional battery 53 is a secondary cell for temporarily storing an electric power generated by the solar cell 10 and in this embodiment, has a rated voltage slightly higher than a rated voltage of the accessory battery 52.

When the rated voltage of the high voltage battery 51 is denoted by V1, the rated voltage of the accessory battery 52 is denoted by V2 and the rated voltage of the additional battery 53 is denoted by V3, a relationship V1>V3>V2 is established in the solar power generation system according to this embodiment. The rated voltages V2 and V3 do not need to satisfy the relationship V3>V2.

SOC sensors 54, 55 and 56 for detecting a charge state (SOC: State of Charge) are provided in the batteries 51, 52 and 53, respectively. Each of the SOC sensors 54, 55 and 56 outputs an SOC which corresponds to information on an index of the actual charge state with respect to the full charge state of the respective battery.

The charge ECU 20 is connected to the solar cell 10 via a generated electric power output cable 11 and receives a generated electric power output from the solar cell 10. In addition, the charge ECU 20 is connected to the high voltage, accessory and additional batteries 51, 52 and 53 via a high voltage charge cable 61, an accessory charge cable 62 and an additional cable 63, respectively. Thereby, charge paths are formed between the batteries 51, 52 and 53 and the charge ECU 20, respectively. Note that a power source section is formed in the charge ECU 20 to be supplied from the accessory battery 52 and the solar cell 10 with an electric power necessary to drive the charge ECU 20.

An electric power receiving line 21 connected to the generated electric power output cable 11 is provided in the charge ECU 20 and forms a current flow path for the generated electric power. A sensor section 22 is interposed in the electric power receiving line 21. The sensor section 22 includes an electric current sensor for detecting an electric current flowing through the electric power receiving line 21 and a voltage sensor for detecting a voltage of the electric power receiving line 21. A main DC/DC converter 30 is provided in the electric power receiving line 21 at a secondary side of the sensor section 22 (a side for receiving a generated electric power will be referred to as the primary side and a side for supplying the electric storage device 50 with the generated electric power will be referred to as the secondary side). The main DC/DC converter 30 is a voltage-increase/decrease circuit for increasing or decreasing a voltage of a generated electric power input from the solar cell 10 and outputting the electric power having the increased or decreased voltage therefrom. A secondary side line, to which the main DC/DC converter 30 outputs an electric power, will be referred to as the primary line 23.

The primary line 23 branches into a first line 24 corresponding to a current flow path for supplying an electric power to the high voltage battery 51, a second line 25 corresponding to a current flow path for supplying an electric power to the accessory battery 52 and a third line 26 corresponding to a current path for supplying an electric power to the additional battery 53. A first DC/DC converter 31 is provided in the first line 24. The first DC/DC converter 31 is a voltage-increase circuit for receiving an electric power output from the main DC/DC converter 30, increasing the voltage of the received electric power to a high voltage battery charge set voltage suitable for charging the high voltage battery 51 and supplying the voltage-increased electric power to the high voltage battery 51 via the high voltage charge cable 61. A second DC/DC converter 32 is provided in the second line 25. The second DC/DC converter 32 is a voltage-increase/decrease circuit for receiving an electric power output from the main DC/DC converter 30, increasing or decreasing the voltage of the received electric power to an accessory battery charge set voltage suitable for charging the accessory battery 52 and supplying the voltage-adjusted electric power to the accessory battery 52 via the accessory charge cable 62. The third line 26 is connected to the additional battery 53 via the additional cable 63. Note that each of the electric power receiving line 21, the primary line 23 and the first, second and third lines 24, 25 and 26 is comprised of two lines including an electric power line and a ground line. The same is applied to each of the cables 11, 61, 62 and 63.

As described above, the charge ECU 20 constitutes a charger by the main, first and second DC/DC converters 30, 31 and 32. An electric power generated by the solar cell 10 is normally charged in the additional battery 53 temporarily. Thus, the output voltage of the main DC/DC converter 30 is adjusted to a value corresponding to the charge set voltage of the additional battery 53. In this solar power generation system, the main DC/DC converter 30 has voltage-increase and voltage-decrease functions and the second DC/DC converter 32 has voltage-increase and voltage-decrease functions. Thus, the solar power generation system can address various magnitude relationship among the rated voltages of the solar cell 10 and the accessory and additional batteries 52 and 53. In addition, this solar power generation system can appropriately select the battery to be charged.

Figure 5:
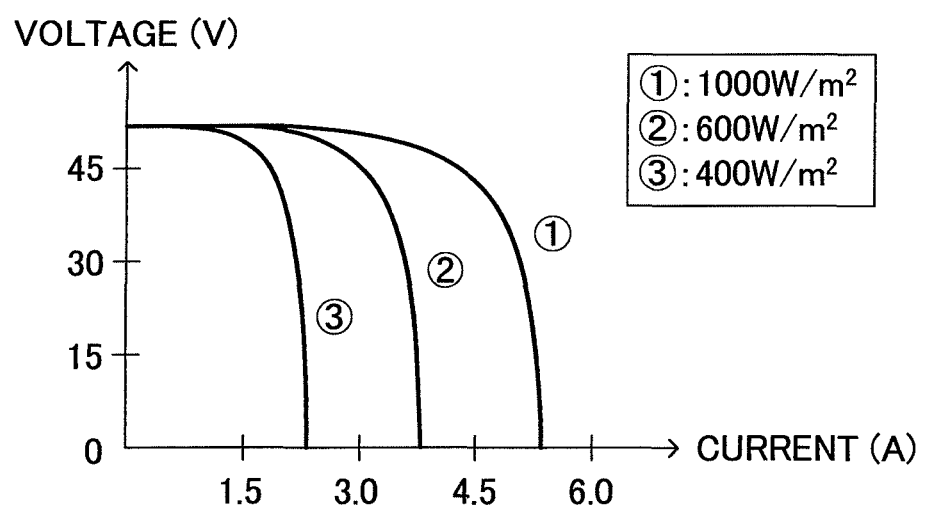
FIG. 5 shows an exemplary graph of an electric power generation property of a solar cell.

A microcomputer 40 is provided in the charge ECU 20. The microcomputer 40 controls operations of the DC/DC converters 30, 31 and 32. When the microcomputer 40 controls operations of the DC/DC converters 30, 31 and 32, the microcomputer 40 reads sensor signals of the sensor section 22 and determines whether or not the solar cell 10 is in a generation state capable of charging the electric storage device 50 appropriately. When an intensity of the sunlight is small, an amount of an electric power generated by the solar cell 10 is small. Thus, the charge ECU 20 should be activated only when the amount of the generated electric power is larger than an amount of the electric power consumed by the charge ECU 20. In a conventional device, the charge ECU 20 is activated when the generated electric power exceeds a set voltage. In this regard, the solar cell 10 has an output voltage property shown in FIG. 5 and thus, the solar power generation system is activated even when the intensity of the sunlight is small and an amount of the generated electric power is not sufficient. Further, the charge ECU 20 is connected in a communication manner to the other ECU for controlling a drive of the travel-drive motor 100 to be supplied with an electric power from the high voltage battery 51 and thus, activates the other ECU by the activation of the charge ECU 20 itself. Accordingly, this embodiment sets a detection interval of detecting the electric power generation state and detects the electric power generation state only at a detection timing defined by the detection interval to limit a frequency of activating the charge ECU 20 by the detection interval. In addition, when the voltage of the generated electric power at the detection timing is lower than the set voltage, an unnecessary activation of the charge ECU 20 and an unnecessary charge operation carried out by the charge ECU 20 can be suppressed by correcting the detection interval such that the detection interval increases gradually.

<Embodiment of Solar Charge Control Routine>

Figure 2:
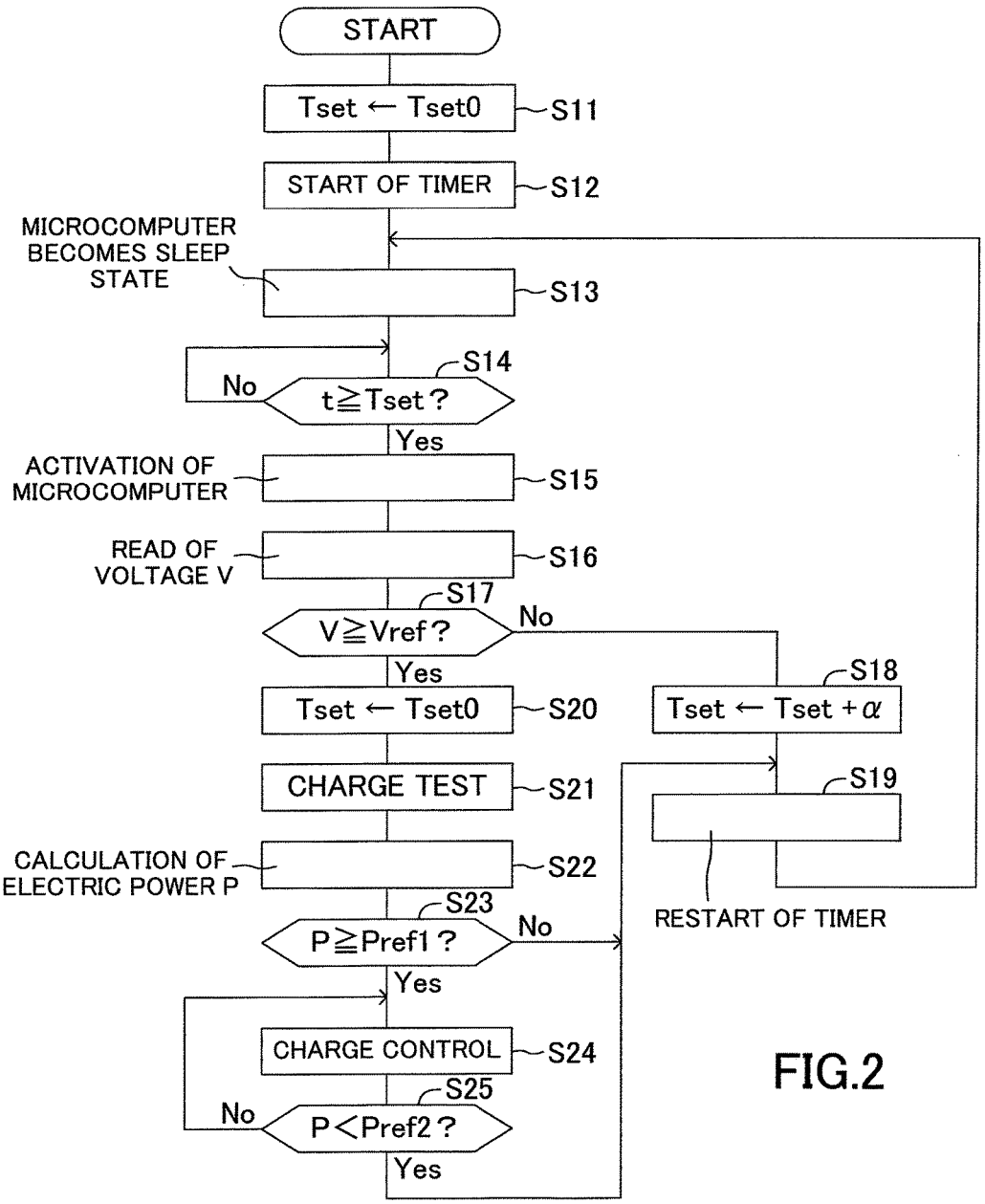
FIG. 2 shows a flowchart of a solar charge control routine according to the embodiment.

Below, a charge control of the electric power generated by the solar cell 10 (hereinafter, this control will be referred to as the solar charge control) will be explained with reference to FIG. 2. FIG. 2 shows a solar charge control routine executed by the microcomputer 40. This routine is repeatedly executed after a predetermined operation for activating the solar power generation system is carried out.

First, at a step S11, the microcomputer 40 sets a timer set value Tset, which indicates the detection interval, to an initial value Tset0 and then, proceeds with the process to a step S12 to start an operation of the time measurement timer. Next, the microcomputer 40 proceeds with the process to a step S13 to put the microcomputer 40 itself to a sleep state to maintain an amount of the consumed electric power at a minimum amount. Even when the microcomputer 40 is in the sleep state, the function of the time measurement timer works. When the microcomputer 40 determines at a step S14 that a timer value t is equal to or larger than a timer set value Tset, the microcomputer 40 proceeds with the process to a step S15 to activate the microcomputer 40 itself. Thereby, the charge ECU 20 is activated, the operation of charging the electric storage device 50 is ready. Next, the microcomputer 40 proceeds to the process to a step S16 to read a generated electric power voltage detected by a voltage sensor of the sensor section 22 and then, proceeds with the process to a step S17 to determine whether or not the detected generated electric power voltage V is equal to or larger than an electric power generation determination threshold Vref. This generated electric power voltage V corresponds to an output voltage when the solar cell 10 provides the load with no electric power, that is, an open circuit voltage of the solar cell 10.

For example, during night time, no generated electric power voltage is output from the solar cell 10. In this case, the microcomputer 40 determines "No" at the step S17 and then, proceeds with the process to a step S18 to increase the timer set value Tset by an addition set value α (Tset←Tset+α). Next, the microcomputer 40 proceeds with the process to a step S19 to restart an operation of the time measurement timer and then, returns the process to the step S13. In other words, after the microcomputer 40 clears the timer value t to zero, the microcomputer 40 starts a time measurement and then, returns itself to the sleep state. When a solar radiation is less, the aforementioned processes are carried out repeatedly. In this case, the timer set value Tset is increased as the time proceeds and the interval of activating the microcomputer 40 (an interval of carrying out a determination regarding the generated electric power voltage) is gradually elongated. Therefore, an amount of the electric power consumed due to the activation of the charge ECU 20 can be reduced. Further, a frequency of activating the other ECU due to the activation of the charge ECU 20 can be reduced and thus, an amount of the electric power consumed due to the activation of the other ECU can be reduced.

When the intensity of the solar irradiation increases while such processes are carried out repeatedly, the generated electric power voltage V increases and thus, the microcomputer 40 determines "Yes" at the step S17. In this case, the microcomputer 40 proceeds with the process to a step S20 to return the timer set value Tset to the initial value Tset0. Next, the microcomputer 40 proceeds with the process to a step S21 to execute a trial charge process. This process is not a formal charge process, but is a temporary process for the purpose of measurement of the electric power output from the solar cell 10. For example, the microcomputer 40 temporarily activates only the main DC/DC converter 30. Thereby, a charge electric current flows from the solar cell 10 to the additional battery 53. The microcomputer 40 proceeds with the process to a step S22 to read sensor values of the electric current and voltage sensors of the sensor section 22 to calculate an electric power P output from the solar cell 10. Next, the microcomputer 40 proceeds with the process to a step S23 to determine whether or not the calculated electric power P is equal to or larger than an electric power generation determination threshold Pref1.

Note that the electric power indicates an amount of work of the electric current per unit time and thus, the microcomputer 40 may read an electric current I detected by the electric current sensor at the step S22 in place of the electric power P and determine at the step S23 whether or not the current I flowing from the solar cell 10 is equal to or larger than an electric power generation determination threshold Iref1. Further, it is not always necessary to supply an electric power to the additional battery 53 in order to detect an electric power generation ability of the solar cell 10. For example, there may be employed a configuration of detecting an electric power or an electric current by turning on a switch to flow an electric current through an electric resistance, both of the switch and the resistance being provided for the electric power generation ability determination between an electric power line and a ground line of the electric power receiving line 21 between the sensor section 22 and the main DC/DC converter 30. In this case, it is not necessary to activate the main DC/DC converter 30.

The electric power generation determination threshold Pref1 is set to a value larger than an amount of the electric power consumed for activating the charge ECU 20. When the microcomputer 40 determines at the step S23 that the electric power P is smaller than the electric power generation determination threshold Pref1, it can be judged that the solar cell 10 generates an electric power to an extent with the solar radiation, however, an amount of the generated electric power is smaller than the electric power consumed by the charge ECU 20. Accordingly, when the microcomputer 40 determines "No" at the step S23, the microcomputer 40 returns the process to the step S19. Thereby, an operation of the time measurement timer is restarted and the microcomputer 40 turns to the sleep state. In this case, the timer set value Tset has been returned to the initial value Tset0. In other words, the detection interval of detecting the electric power generation state is returned to an initial interval. This is because the generated electric power is likely to increase when the generated electric power voltage V is equal to or higher than the electric power generation determination threshold Vref, compared with when the electric power generation voltage V is lower than the electric power generation determination threshold Vref.

When the microcomputer 40 determines at the step S23 that the electric power P is equal to or larger than the electric power generation determination threshold Pref1 while the microcomputer 40 executes such processes repeatedly, the microcomputer 40 proceeds with the process to a step S24 to execute a charge control. In this case, the microcomputer 40 activates the main DC/DC converter 30 to cause an electric current to flow from the solar cell 10 to the additional battery 53. Thereby, the additional battery 53 is charged. Then, the microcomputer 40 proceeds with the process to a step S25 to determine whether or not the electric power P output from the solar cell 10 is smaller than an electric power generation determination threshold Pref2. The microcomputer 40 continues the execution of the charge control of the step S24 while the electric power P is equal to or larger than the electric power generation determination threshold Pref2. This electric power generation determination threshold Pref2 is set to a value slightly larger than the electric power consumed by the ECU 20 and smaller than the electric power generation determination threshold Pref1.

When the microcomputer 40 determines that the electric power P output from the solar cell 10 decreases to a value smaller than the electric power generation determination threshold Pref2, the microcomputer 40 terminates the charge of the additional battery 53 and then, proceeds with the process to the step S19. Thereby, an operation of the time measurement timer is restarted and the microcomputer 40 repeats the aforementioned processes.

When the microcomputer 40 reads the SOC detected by the SOC sensors 54, 55 and 56 during the charge control of the step S24 and the SOC of the additional battery 53 reaches a base value or the SOC of the high voltage battery 51 decreases to a value smaller than a base value, the microcomputer 40 activates the main DC/DC converter 30 as well as the first DC/DC converter 31 to supply an electric power from the additional battery 53 to the high voltage battery 51. In this case, for effectively using the electric power generated by the solar cell 10, the microcomputer 40 controls the output voltage of the main DC/DC converter 30 such that both of the electric power generated by the solar cell 10 and the electric power output from the additional battery 53 are supplied to the high voltage battery 51. For example, the microcomputer 40 controls the output voltage of the main DC/DC converter 30 such that the output voltage of the main DC/DC converter 30 becomes equal to the output voltage of the additional battery 53. Further, when the microcomputer 40 detects a decrease of the SOC of the accessory battery 52 during the charge control of the step S24, the microcomputer 40 activates the main DC/DC converter 30 as well as the second DC/DC converter 32 to supply the accessory battery 52 with the electric power generated by the solar cell 10, thereby to charge the accessory battery 52.

As described above, in the solar power generation system according to this embodiment, there is set a charge start condition for starting to charge the electric storage device 50 with the electric power generated by the solar cell 10. When the charge start condition is not satisfied, the solar power generation system prohibits the charge operation by causing the microcomputer 40 to be in the sleep state until the next detection timing of the electric power generation ability. Only when the charge start condition is satisfied, the solar power generation system starts to charge the electric storage device 50. This charge start condition is an AND condition including a condition that the generated electric power voltage V of the solar cell 10 is equal to or higher than the electric power generation determination threshold Vref (hereinafter, this condition will be referred to as the first condition) and a condition that an amount of the electric power output from the solar cell 10 is equal to or larger than the electric power generation determination threshold Pref1 (hereinafter, this condition will be referred to as the second condition). The microcomputer 40 determines whether or not the first condition is satisfied at the predetermined detection interval. When the microcomputer 40 determines that the first condition is not satisfied, the microcomputer 40 maintains itself at the sleep state until the next detection timing of the generated electric power (without determining whether or not the second condition is satisfied). In addition, when the first condition is not satisfied, the microcomputer 40 increases the detection interval by the addition set value α. Thereby, the detection interval is increased as the number of the consecutive prohibitions of the charge operation carried out by the charge ECU 20 increases. As a result, under the state that there is no solar radiation necessary for the solar power electric generation, the detection interval is gradually increased and thus, a frequency of activating the charge ECU 20 can be reduced. Further, when the first condition is not satisfied, the process (the trial charge) for detecting the electric power output from the solar cell 10 is not carried out and thus, the amount of the consumed electric power can be reduced. As a result, the durability of the charge ECU 20 can be improved and an amount of the electric power consumed by the charge ECU 20 can be reduced.

When an amount of the electric power output from the solar cell 10 is smaller than the electric power generation determination threshold Pref1 after the solar cell 10 starts the electric power generation, the second condition is not satisfied. Thus, the charge ECU 20 does not start to charge the electric storage device 50. Therefore, the SOC of the electric storage device 50 can be prevented from being decreased due to the activation of the charge ECU 20.

For example, when the detection interval is initially set to a large constant value, the solar power generation system cannot address change of solar radiation and thus, an actual timing of starting to charge the electric storage device 50 may be substantially delayed with respect to a target timing of charging the electric storage device 50. In other words, a charge opportunity of the generated electric power may be lost. However, when the detection interval is initially set to a small constant value, a frequency of activating the microcomputer 40 is increased and when the first condition is satisfied, a frequency of carrying out the trial charge is increased in order to determine whether or not the second condition is satisfied. Therefore, this is not preferred in terms of a durability of the main DC/DC converter 30 because a frequency of activating the main DC/DC converter 30.

Accordingly, when the first condition is not satisfied, in other words, when the open circuit voltage V of the solar cell 10 is lower than the electric power generation determination threshold Vref, in many cases, an amount of the electric power generated by the solar cell 10 does not begin to increase promptly and thus, in this embodiment, the detection interval is increased gradually. Thereby, a frequency of activating the charge ECU 20 can be reduced without losing the charge opportunity. Further, even when the first condition is satisfied, it is determined whether or not the second condition is satisfied without starting an operation of charging the electric storage device 50 and when an amount of the electric power capable of being generated by the solar cell 10 becomes larger than an amount of the electric power consumed by the charge ECU 20, the charge operation is started. As a result, the electric power generated by the solar cell 10 can be appropriately charged to the electric storage device 50.

In this embodiment, when the solar charge control routine is started, the microcomputer 40 turns to the sleep state once. However, the microcomputer 40 may be configured not to turn to the sleep state when the solar charge control routine is started (only when the solar charge control routine is started, the processes of the steps S12 to S15 may be omitted). In the solar charge control routine, the processes of the step S13 and the steps following the step S13 are repeatedly executed and thus, the omission of such processes only at the activation of this routine does not matter.

<Modified Example 1 of Solar Charge Control Routine>

Figure 3:
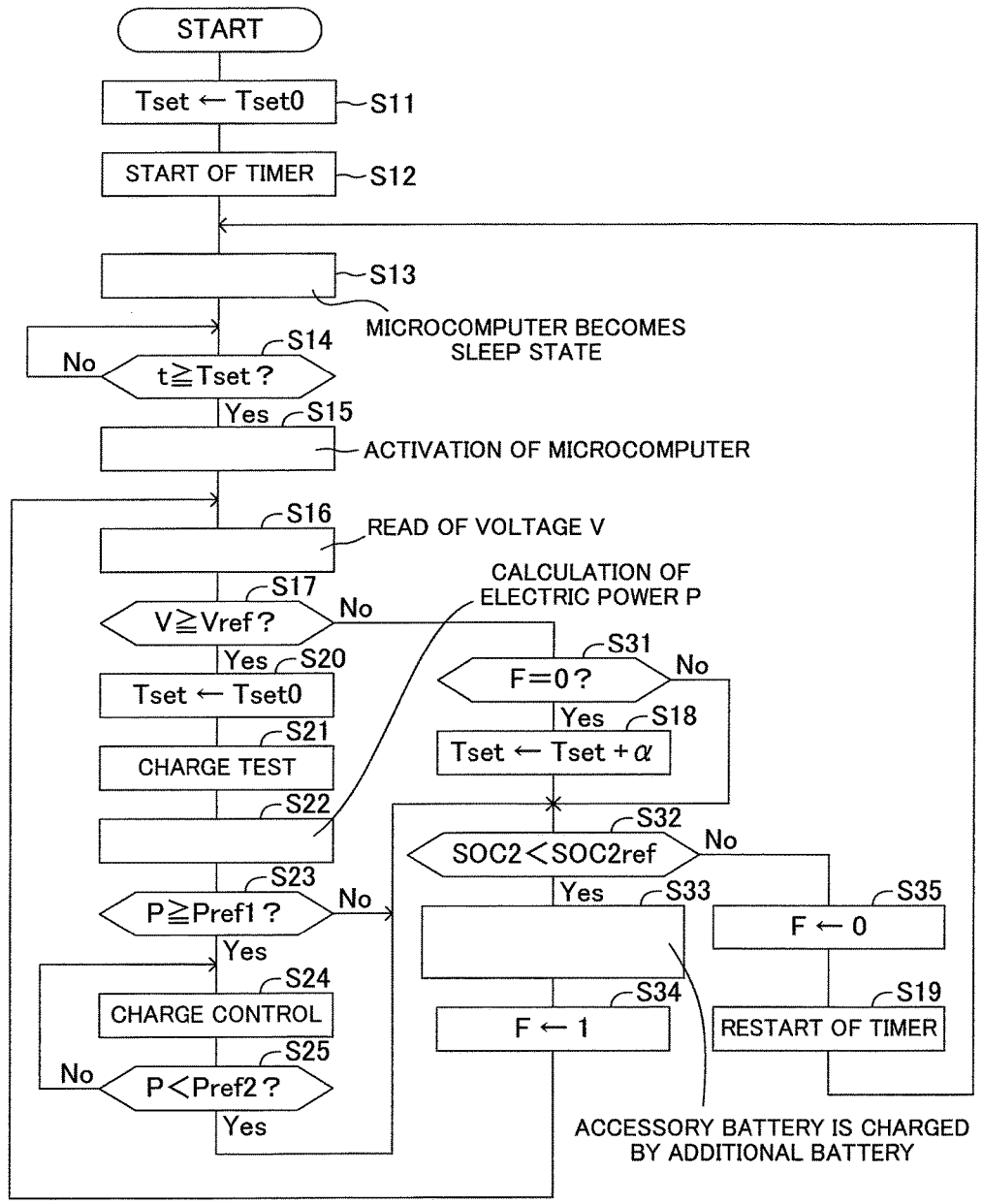
FIG. 3 shows a flowchart of the solar charge control routine according to a modified example 1.

Next, a modified example 1 of the solar charge control routine will be described. In this modified example 1, in case that the SOC of the accessory battery 52 is small, even when an intensity of the solar radiation is small and thus, the charge to the electric storage device 50 is not carried out, the accessory battery 52 is charged. FIG. 3 shows the solar charge control routine executed by the microcomputer 40 according to the modified example 1. Steps of the same processes as the processes of the solar charge control routine according to the aforementioned embodiment are denoted by the same reference symbols as the reference symbols used for denoting the steps of the same processes according to the aforementioned embodiment (FIG. 2) as the processes of the solar charge control routine according to the modified example 1. Thus, the descriptions of those steps will be omitted. The solar charge control routine according to the modified example 1 corresponds to a routine obtained by adding processes of steps S31, S32, S33, S34 and S35 to the solar charge control routine according to the aforementioned embodiment.

When the microcomputer 40 determines at the step S17 that the voltage of the generated electric power V is lower than the electric power generation determination threshold Vref, the microcomputer 40 proceeds with the process to a step S31 to read a value of an accessory charge flag F and determine whether or not the value of the accessory charge flag F is zero (F=0). The value of this accessory charge flag F is set to "1" when the accessory battery 52 is charged as described later. On the other hand, the value of the accessory charge flag F has been set to zero when this routine is started. When the value of the accessory charge flag F is "0", the microcomputer 40 proceeds with the process to the step S18 and on the other hand, when the value of the accessory charge flag F is "1", the microcomputer 40 skips the process of the step S18. This process is executed for preventing the detection interval from being increased many times while the accessory battery 52 is charged.

Then, the microcomputer 40 proceeds with the process to a step S32 to read an SOC detected by the SOC sensor 55 provided for the accessory battery 52 (hereinafter, this SOC will be referred to as the SOC2) and determines whether or not the SOC2 is smaller than an accessory charge start determination threshold SOC2ref. When the SOC2 is smaller than the accessory charge start determination threshold SOC2ref, the microcomputer 40 proceeds with the process to a step S33 to control an operation of the second DC/DC converter 32 to charge the accessory battery 52 with the electric power stored in the additional battery 53. In this case, the microcomputer 40 sets the output voltage of the second DC/DC converter 32 to a set voltage suitable for charging the accessory battery 52 and operates the second DC/DC converter 32. Thereby, the accessory battery 52 can be charged with the electric power stored in the additional battery 53.

Next, the microcomputer 40 proceeds with the process to a step S34 to set the value of the accessory charge flag F to "1" and then, returns the process to the step S16. In this manner, when the voltage of the electric power generated by the solar cell 10 is lower than the electric power generation determination threshold Vref, the accessory battery 52 is continued to be charged until the SOC2 of the accessory battery 52 reaches the accessory charge start determination threshold SOC2ref. In this case, the timer set value Tset is not increased because of the determination of the step S31 (S31: No). In this regard, when the voltage V of the electric power generated by the solar cell 10 becomes equal to or higher than the electric power generation determination threshold Vref1 during the charge to the accessory battery 52 and an amount P of the electric power output from the solar cell 10 is smaller than the electric power generation determination threshold Pref1 (S23: No), the process is proceeded to the step S32 to continue the charge to the accessory battery 52. Further, when the amount P of the electric power output from the solar cell 10 becomes the electric power generation determination threshold Pref1 during the charge to the accessory battery 52 (S23: Yes), the charge to the accessory battery 52 is terminated and the charge to the additional battery 53 is started (S22, S23).

When the microcomputer 40 executes such processes repeatedly and then, the SOC2 of the accessory battery 52 becomes equal to or larger than the accessory charge start determination threshold SOC2ref (S32: No), the microcomputer 40 sets the value of the accessory charge flag F to "0" and proceeds with the process to the step S19 to restart an operation of the time measurement timer. Note that regarding the accessory charge start determination threshold SOC2ref, a hysteresis may be provided between a threshold used for determining whether or not a charge to the accessory battery 52 should be started and a threshold used for determining whether or not the charge to the accessory battery 52 should be terminated.

According to the aforementioned solar charge control routine of the modified example 1, in addition to actions and effects of the aforementioned embodiment, even when the accessory battery 52 cannot be charged by the solar power generation, there can be obtained an effect that the accessory battery 52 can be appropriately charged using the additional battery 53.

Note that an electric power source circuit of the charge ECU 20 is configured to receive the electric power from the accessory battery 52 and the solar cell 10 as electric power sources. Therefore, in case that the solar cell 10 generates electric power by the sunlight even when the SOC of the accessory battery 52 decreases and the output voltage of the accessory battery 52 becomes lower than a voltage capable of operating the charge ECU 20, the charge ECU 20 can be activated by the generated electric power. Thereby, the accessory battery 52 can be charged using the additional battery 53 and the electric power stored in the accessory battery 52 can be prevented from being exhausted.

<Modified Example 2 of Solar Charge Control Routine>

Figure 4:
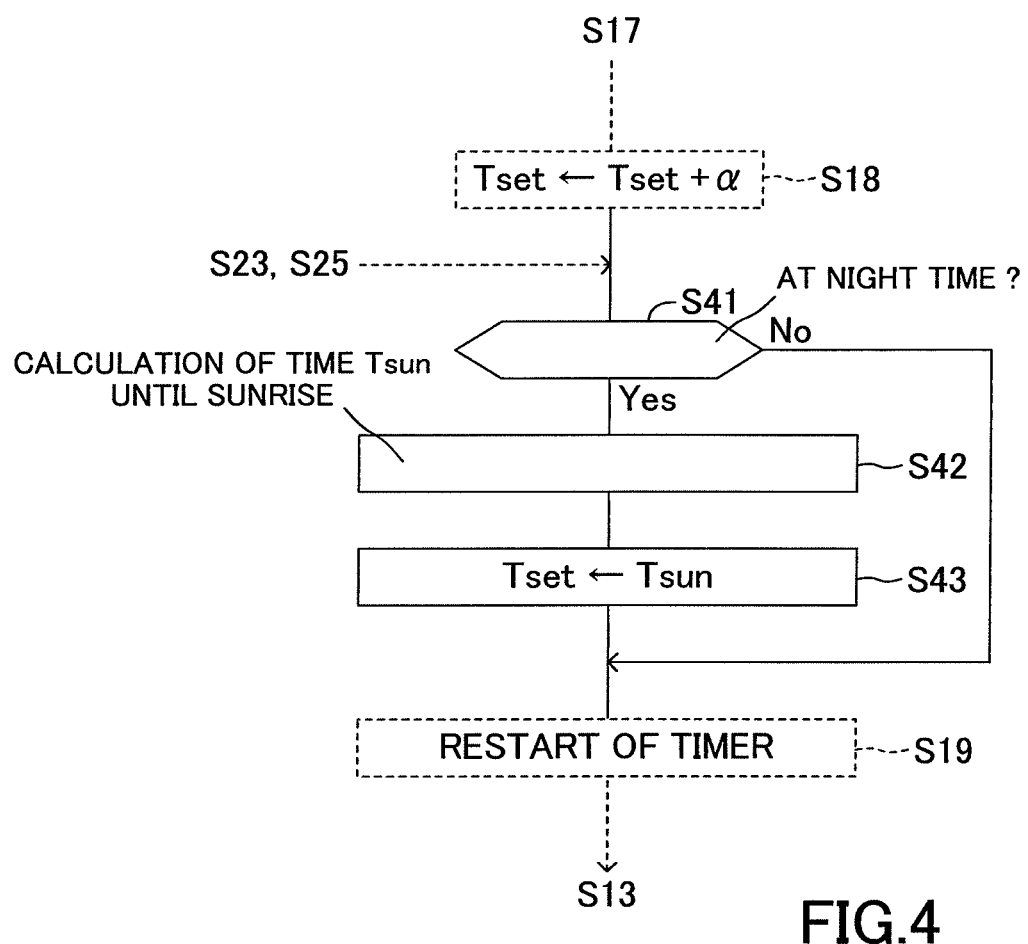
FIG. 4 shows a flowchart of the solar charge control routine according to a modified example 2.

Next, the solar charge control routine according to a modified example 2 will be described. According to the modified example 2, the microcomputer 40 is maintained at the sleep state during a time zone incapable of realizing the solar power generation. FIG. 4 shows a characteristic part of the solar charge control routine executed by the microcomputer 40 according to the modified example 2. In this modified example 2, processes of steps S41 to S43 are added before the process of the step S19 of the solar charge control routine according to the aforementioned embodiment. Therefore, below, the processes of the added steps will be described.

When the charge start condition is not satisfied (S17: Yes and S23: No) or when the charge control of the electric storage device 50 is terminated (S25: Yes), the microcomputer 40 proceeds with the process to a step S41 to determine whether or not the present time is within the time zone not capable of realizing the solar power generation (hereinafter, this zone will be referred to as the night time). The microcomputer 40 has a function of acquiring information on time from an in-vehicle device (for example, a navigation device) having a clock function and determines whether or not the present time indicated by the information on time corresponds to the night time. The microcomputer 40 has previously stored the time zone corresponding to the night time and realizes the aforementioned determination on the basis of the stored time zone and the present time. Note that the time zone not capable of realizing the solar power generation varies throughout the year and thus, when information on a calendar (information on present month and day) in addition to the information on time can be acquired, it is preferred that the time zone set as the night time is variably set on the basis of the information on the calendar.

When the microcomputer 40 determines "Yes" at the step S41, the microcomputer 40 proceeds with the process to a step S42 to calculate a time period Tsun which is a time from the present time to the end of the night time (to a time of a sunrise). Next, the microcomputer 40 sets the time period Tsun to the timer set value Tset (Tset Tsun) at a step S43 and then, proceeds with the process to the step S19 to execute the aforementioned processes. Note that when the microcomputer 40 sets the time period Tsun to the timer set value Tset at the step S43, the microcomputer 40 stores such a setting as a history data and in case that the microcomputer 40 activates when the night time is terminated, the microcomputer 40 executes a process for setting an initial value Tset0 to the timer set value Tset on the basis of the history data.

According to the aforementioned solar charge control routine according to the modified example 2, the microcomputer 40 is prohibited from being activated during the night time not capable of realizing the solar power generation and thus, the amount of the electric power consumed by the charge ECU 20 is further reduced. Note that the solar charge control routine according to the modified example 2 can be applied to the modified example 1. In this case, the processes of the steps S41 to S43 should be added to between the steps S35 and S19.

Although the charge control device according to the aforementioned embodiment has been described, the present invention is not limited to the aforementioned embodiment and thus, various modifications can be applied to the aforementioned embodiment without departing from the purpose of the present invention.

For example, the charge control device according to the aforementioned embodiment is applied to the solar power generation system installed in the vehicle, however, may be applied to the other solar power generation system. For example, the charge control device may be applied to solar power generation systems for household use and for business use. Although the electric storage device 50 according to the aforementioned embodiment includes the three batteries 51, 52 and 53, the electric storage device 50 may include at least one secondary cell.

Further, according to the aforementioned embodiment, when the first condition is not satisfied, the detection interval is increased (see the steps S17 and S18). However, when the first condition is satisfied and the second condition is not satisfied, the detection interval may be increased. In this case, the process of the step S20 should be executed immediately after it is determined "Yes" at the step S23. In addition, the process of the step S18 should be executed when it is determined "No" at the step S23. Further, an upper limit may be provided for the addition set value cc for increasing the detection interval.

Further, according to the aforementioned embodiment, the detection interval is variably set such that the detection interval is increased by the addition set value α. However, the setting of the detection interval may be realized by switching the detection interval between long and short detection intervals. Further, the detection interval may be increased exponentially.

Further, according to the aforementioned embodiment, the charge start condition includes two conditions (the first and second conditions). However, for example, the charge start condition includes only one of the first and second conditions.

The invention claimed is:

1. A charge controller configured to charge an electric storage device with an electric power generated by a solar cell, the charge controller comprising:
at least one processor configured to:
activate the at least one processor itself from a sleep state at an activation timing occurring at or after a predetermined time interval to acquire an electric power generation index, which indicates a magnitude of a generated electric power output of the solar cell;
start a charge operation for charging the electric storage device when the acquired electric power generation index satisfies a charge start condition;
prohibit starting the charge operation for charging the electric storage device and returning the at least one processor to the sleep state when the electric power generation index does not satisfy the charge start condition; and
increase the predetermined time interval for the next activation timing to activate the at least one processor itself from the sleep state, the predetermined time interval increasing in duration in accordance with an increase of a number of consecutive prohibitions of starting the charge operation.

2. The charge controller as set forth in claim 1, wherein the at least one processor is further configured to:
acquire an open circuit voltage of the solar cell and an electric power correlation value having a correlation with an electric power output from the solar cell when an electric current is caused to flow from the solar cell, as the electric power generation index,
wherein the charge start condition includes two conditions, one of the conditions being a condition that the open circuit voltage is equal to or higher than a set voltage and the other condition being a condition that the electric power correlation value is equal to or larger than a set electric power correlation value, and determine in advance whether the charge start condition relating to the open circuit voltage of the solar cell of the two conditions is satisfied.

3. The charge controller as set forth in claim 2, wherein the at least one processor is further configured to increase the predetermined time interval for the next activation timing in accordance with an increase of the number of consecutive prohibitions of starting the charge operation carried out when the open circuit voltage of the solar cell is lower than the set voltage.

* * * * *